United States Patent
Erhart et al.

(10) Patent No.: US 8,437,464 B2
(45) Date of Patent: May 7, 2013

(54) HANDLING OF A SESSION INITIATION PROTOCOL-CAPABLE TELECOMMUNICATIONS TERMINAL THAT IS PUT ON HOLD

(75) Inventors: George William Erhart, Loveland, CO (US); Valentine C. Matula, Granville, OH (US); David Joseph Skiba, Golden, CO (US)

(73) Assignee: Avaya, Inc., Basking Ridge, NJ (US)

( * ) Notice: Subject to any disclaimer, the term of this patent is extended or adjusted under 35 U.S.C. 154(b) by 1122 days.

(21) Appl. No.: 11/935,209

(22) Filed: Nov. 5, 2007

(65) Prior Publication Data

US 2009/0116635 A1    May 7, 2009

(51) Int. Cl.
*H04M 3/00* (2006.01)
(52) U.S. Cl.
USPC .............................. 379/266.01; 379/265.01
(58) Field of Classification Search ............ 379/265.01, 379/266.01, 215.01
See application file for complete search history.

(56) References Cited

U.S. PATENT DOCUMENTS

| | | | |
|---|---|---|---|
| 6,141,328 A | 10/2000 | Nabkel et al. | |
| 8,082,342 B1 * | 12/2011 | Stolboushkin | 709/224 |
| 2002/0067823 A1 | 6/2002 | Walker et al. | |
| 2003/0035531 A1 * | 2/2003 | Brown et al. | 379/265.01 |
| 2003/0108185 A1 | 6/2003 | Brown et al. | |
| 2003/0108187 A1 * | 6/2003 | Brown et al. | 379/266.03 |
| 2005/0147227 A1 | 7/2005 | Chervirala et al. | |
| 2006/0245579 A1 | 11/2006 | Bienfait | |
| 2006/0268858 A1 | 11/2006 | Hagale et al. | |
| 2007/0133465 A1 | 6/2007 | Promenzio et al. | |

FOREIGN PATENT DOCUMENTS

JP    2005191881 A    7/2005

OTHER PUBLICATIONS

Euros Morris, "GB Application No. GB08174476 Search Report", Dec. 18, 2008, Publisher: GB Intellectual Property Office, Published in: GB.

* cited by examiner

*Primary Examiner* — Rasha Al Aubaidi

(57) ABSTRACT

A method is disclosed that enables the proper treatment of a queued call by a call center, or other data-processing system capable of queuing calls, in which the calling terminal of the queued call has been put on hold by its user. The call center is able to detect the terminal being put on hold by monitoring for a SIP re-INVITE request, in which the session description signifies an on-hold condition. When it is determined that the calling terminal is on hold, the call center modifies its treatment of the queued call. For example, the call center might freeze the call's position in the queue until the calling party takes the phone off of hold. As another example, the call center might allow the call to work its way to the top of the queue, with the terminal on hold, and then maintain the call's position at the top of the queue until a service agent is available.

11 Claims, 4 Drawing Sheets

HANDLING OF A SESSION INITIATION PROTOCOL-CAPABLE TELECOMMUNICATIONS TERMINAL THAT IS PUT ON HOLD

CROSS REFERENCE TO RELATED APPLICATIONS

The following application is incorporated herein by reference:

(1) U.S. patent application Ser. No. 11/828,578, filed Jul. 26, 2007. If there are any contradictions or inconsistencies in language between the present application and the incorporated application that might affect the interpretation of the claims contained herein, the claims should be interpreted to be consistent with the language contained herein.

FIELD OF THE INVENTION

The present invention relates to telecommunications in general, and, more particularly, to managing a queued call that involves a Session Initiation Protocol-capable (SIP-capable) telecommunications terminal.

BACKGROUND OF THE INVENTION

A call center is a centralized office used for the purpose of handling a large volume of telephone calls. For example, a call center can be operated by an enterprise to process incoming calls from customers seeking product support or other information, in which the calls are directed to service agents who can then assist the customers. If a service agent is not immediately available to handle an incoming call, the call can be placed in a queue to wait for the next available agent, possibly with other calls that are already queued.

Newer-generation call centers operate in accordance with the Session Initiation Protocol, or "SIP." SIP-enabled calls work differently than traditional plain-old telephone service calls, or "POTS" calls. For example, in traditional POTS telephony a second party's terminal involved in a call does not receive any specific signal when a first party puts his own terminal on hold. In SIP-enabled telecommunications, in contrast, a SIP-capable first terminal sends a message to the second terminal, indicating the on-hold condition of the first terminal. Typically, this involves the first terminal sending, to the second terminal, a SIP "re-INVITE" with a session description protocol (SDP) that disables one or more media streams, possibly including the stream from the second terminal to the first terminal. As a result, the second terminal receives a positive indication of the first terminal having been put on hold by its user, and disables the media stream to the first terminal. The disabling of the media stream can be beneficial, in that it conserves bandwidth utilization.

As mentioned earlier, the call center can place an incoming call in a queue to wait for the next available agent. While the call is queued, the calling party can choose to put his terminal on hold, perhaps to make a quick call to someone else. Similar to the two-terminal example described above, when the caller's terminal signals the on-hold condition to the call center, the call center can disable the media stream being sent to the terminal. Indeed, the benefit associated with the disabling of the media stream is magnified, in that when multiple callers waiting in the queue put their terminals on hold, even more bandwidth utilization is conserved. However, if a call from an on-hold terminal reaches the top of the queue and is assigned to an agent, the agent will receive the call in an on-hold state and will not be able to communicate with the caller.

SUMMARY OF THE INVENTION

The present invention enables the proper treatment of a queued call by a call center, or other data-processing system capable of queuing calls, in which the calling terminal of the queued call has been put on hold by its user. The call center is able to detect the terminal being put on hold by monitoring for a Session Initiation Protocol (SIP) re-INVITE request, in which the session description signifies an on-hold condition. When it is determined that the calling terminal is on hold, the call center modifies its treatment of the queued call. For example, the call center might freeze the call's position in the queue until the calling party takes the phone off of hold. As another example, the call center might allow the call to work its way to the top of the queue, with the terminal on hold, and then maintain the call's position at the top of the queue until a service agent is available.

In some embodiments, the call center transmits an instant message to the calling terminal while the terminal is on hold, in order to provide status that is related to the call being in the queue. For example, the instant message can indicate the call's current disposition in the queue or can indicate that the call will only be queued for a specified amount of time before being removed from the queue (i.e., disconnected), unless the user takes the terminal off hold. The use of instant messaging enables the call center to notify the calling terminal's user, even when he is using his terminal to talk with a third party while on hold with the call center.

The call center of the illustrative embodiment is advantageous, in that it avoids prematurely disconnecting a calling party who has temporarily put her terminal on hold. At the same time, the call center still supports the terminal sending an updated SIP session description for the purpose of managing call resources, such as bandwidth utilization, while the calling terminal is on hold. By managing the call resources, the call center can improve the number of calls per hour that can be handled, or the call center can be used to optimize the initial provisioning of call resources for a given level of anticipated call traffic, or both.

The illustrative embodiment of the present invention comprises: receiving, at a data-processing system from a calling terminal involved in a queued call, a first session initiation protocol (SIP) message with a session description that signifies "on-hold"; and modifying the treatment by the data-processing system of the queued call, the modification being based on receiving the first SIP message.

DETAILED DESCRIPTION

The following term is defined for use in this Specification, including the appended claims:

The term "call," and its inflected forms, is defined as an interactive communication involving one or more telecommunications terminal (e.g., "phone", etc.) users, who are also known as "parties" to the call. A voice call is featured in the illustrative embodiment of the present invention. However, it will be clear those who are skilled in the art, after reading this specification, how to make and use alternative embodiment in which a call is a video call, or an instant messaging (IM) session, or yet another type of call. Furthermore, a call can involve one or more human call parties, or one or more automated devices, or both. A call can be placed in a queue (e.g., at a call center, etc.), along with other calls, in order to wait for final call treatment (e.g., assignment of an agent to the call, etc.). A terminal that is part of a call can be put on hold by its user, either when the call is already queued or without the call being in a queue.

Figure 1:
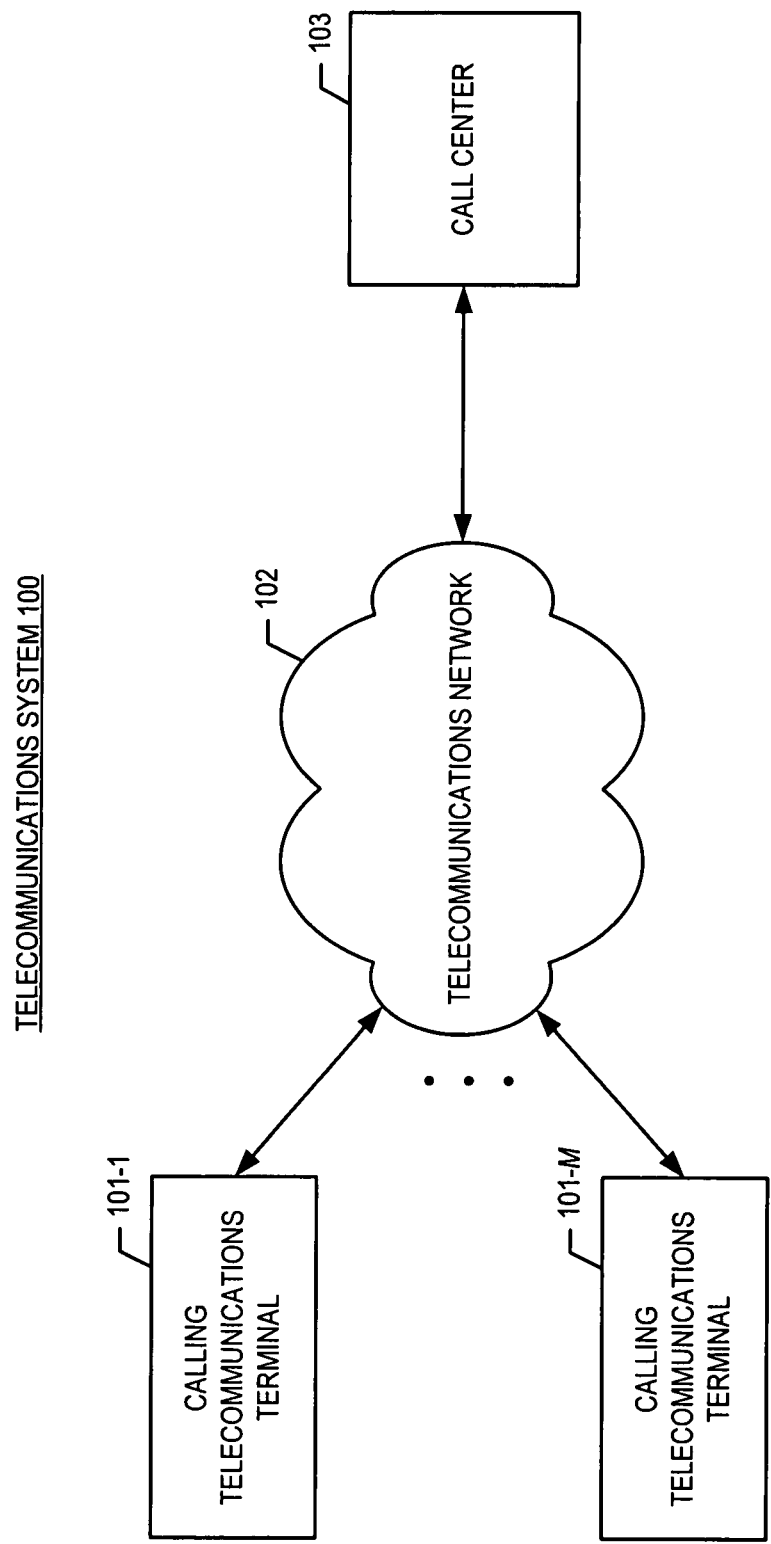
FIG. 1 depicts telecommunications system 100, in accordance with the illustrative embodiment of the present invention.

FIG. 1 depicts telecommunications system 100, in accordance with the illustrative embodiment of the present invention. System 100 comprises calling telecommunications terminals 101-1 through 101-M, wherein M is a positive integer, telecommunications network 102, and call center 103, interconnected as shown.

Calling telecommunications terminal 101-$m$, where m has a value between 1 and M, is a device that is capable of originating or receiving calls, or both. For example, terminal 101-$m$ can be one of a telephone, a notebook computer, a personal digital assistant (PDA), and so forth. Terminals 101-1 through 101-M can be different from one another, such that terminal 101-1 can be a desk set, terminal 101-2 can be a cell phone, terminal 101-3 can be a softphone on a notebook computer, and so forth.

Terminal 101-$m$ handles calls via telecommunications network 102 and is capable of exchanging voice and call processing-related signals with one or more other devices, such as terminals that constitute call center 103. To this end, terminal 101-$m$ exchanges Internet Protocol (IP) data packets with call center 103. It will be clear to those skilled in the art how to make and use terminal 101-$m$.

Telecommunications network 102 is a network such as the Public Switched Telephone Network [PSTN], the Internet, etc. that carries calls to and from telecommunications terminal 101-$m$, call center 103, and other devices not appearing in FIG. 1. A call might be a conventional voice telephony call, a video-based call, a text-based instant messaging (IM) session, a Voice over Internet Protocol (VoIP) call, and so forth.

Call center 103 is a system that receives incoming calls from network 102 and routes the calls the terminals of service agents that are associated with the call center. Call center 103 handles calls via telecommunications network 102 and is capable of exchanging voice and call processing-related signals with one or more other devices. To this end, terminal 101-$m$ exchanges Internet Protocol (IP) data packets with network 102 and also communicates internally with IP data packets. Call center 103 is described in detail below and with respect to FIG. 2.

In addition to exchanging IP packets with each other, the elements of telecommunications system 100 support the Session Initiation Protocol (SIP) and the Session Description Protocol (SDP), as are well-known in the art. SIP is an application-layer control or signaling protocol for creating, modifying, and terminating sessions with one or more participants. The sessions include, in addition to Internet telephone calls, multimedia distribution and multimedia conferences. Invitations in SIP are used to create sessions and carry SDP-compliant session descriptions that allow participants to agree on a set of compatible media types. SIP makes use of proxy servers to help route requests to the user's current location, authenticate and authorize users for services, implement provider call-routing policies, and provide features to users. The protocol runs on top of several different transport protocols including User Datagram Protocol (UDP) and Transmission Control Protocol (TCP). SIP is documented in the Internet Engineering Task Force (IETF) RFC 3261, which is incorporated by reference herein.

Session Description Protocol (SDP) is a protocol for conveying information about media streams in multimedia sessions to allow the recipients of a session description to participate in the session. SDP provides a means to communicate the existence of a session and a means to convey sufficient information to enable others to join and participate in the session. A multimedia session is a set of multimedia senders and receivers and the data streams that flow between or among them. SDP is documented in the IETF RFC 2327, which is incorporated by reference herein.

The illustrative embodiment of the present invention is enabled through the use of the SIP and SDP protocols. However, it will be clear to those skilled in the art, after reading this specification, how to make and use alternative embodiments that feature other protocols instead, where those protocols provide at least some of the functionality equivalent to that offered by SIP and SDP.

Figure 2:
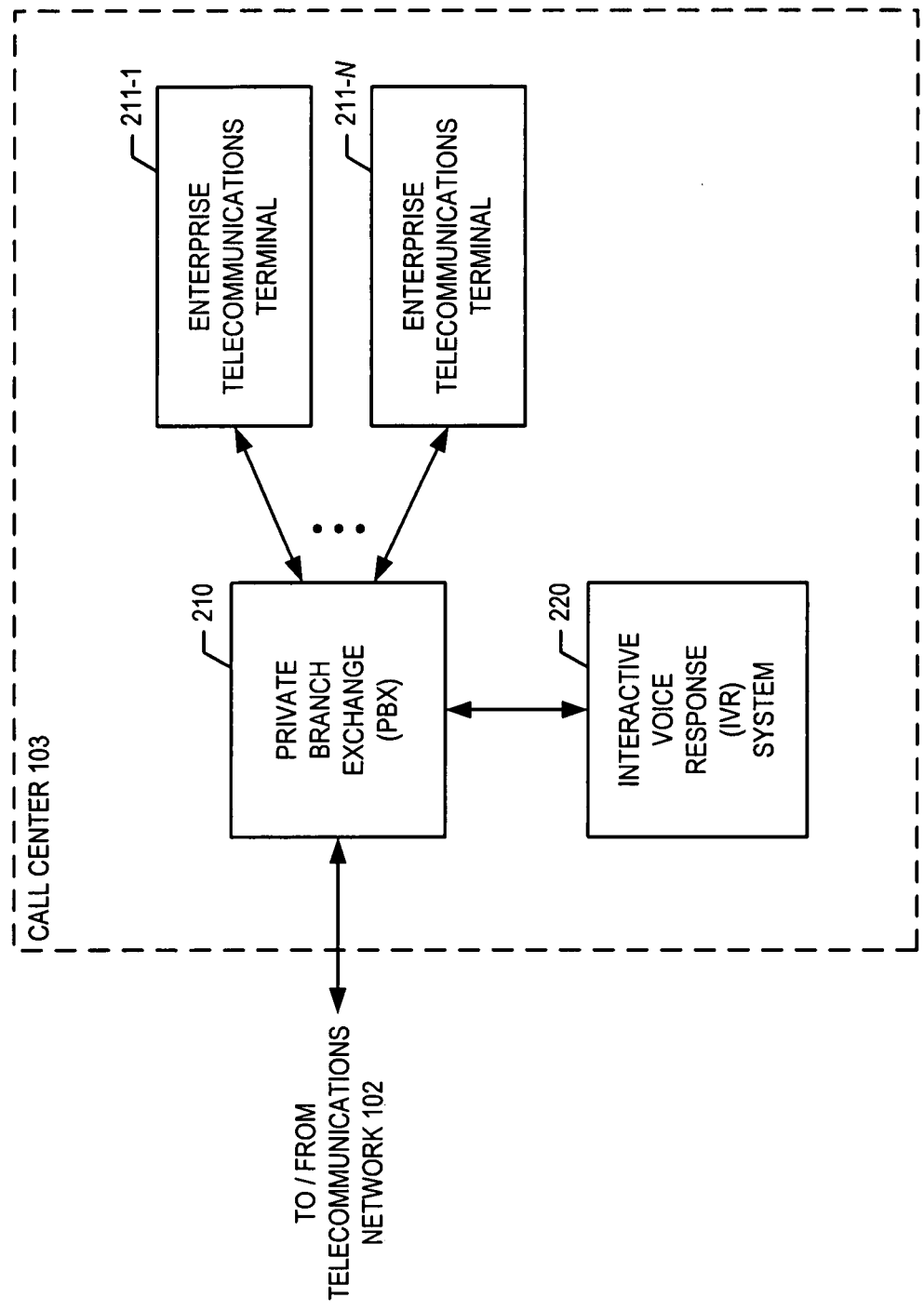
FIG. 2 depicts call center 103, which is part of system 100.

FIG. 2 depicts call center 103, in accordance with the illustrative embodiment of the present invention. Center 103 comprises private branch exchange (PBX) 210, and telecommunications terminals 211-1 through 211-N, wherein N is a positive integer, and interactive voice response (IVR) system 220, interconnected as shown.

Within call center 103, private branch exchange (PBX) 210 receives incoming calls from telecommunications network 102 and directs the calls to one of a plurality of telecommunications terminals within the enterprise (i.e., enterprise terminals 211-1 through 211-N), depending on how exchange 210 is programmed or configured. For example, exchange 210 comprises logic for routing calls to service agents' terminals based on criteria such as how busy various service agents have been in a recent time interval, the telephone number called, and so forth. Exchange 210 communicates with terminals 101-1 through 101-M and terminals 211-1 through 211-N by exchanging Internet Protocol (IP) data packets with those terminals.

Additionally, exchange 210 is capable of queuing each incoming call if all agents are busy, until the queued call can be routed to an available agent at one of enterprise terminals 211-1 through 211-N. Exchange 210 also receives outbound signals from enterprise terminals 211-1 through 211-N, and transmits the signals on to telecommunications network 102 for delivery to a caller's terminal.

Exchange 210 is capable of communicating with IVR system 220, including transmitting the media signals of the calling party of terminal 101-$m$ to system 220. Exchange 210 is also capable of receiving signals from system 220, such as voice and video responses, and of forwarding those signals to terminal 101-$m$.

The salient tasks that exchange 210 is capable of performing are described below and with respect to FIGS. 3 and 4. It will be clear to those skilled in the art, after reading this specification, how to make and use exchange 210.

Enterprise telecommunications terminal 211-$n$, where n has a value between 1 and N, is a device that is capable of originating or receiving calls, or both. In accordance with the illustrative embodiment, terminal 211-$n$ is a workstation softphone at a call center, while in some alternative embodiments terminal 211-$n$ can be one of a telephone, a notebook computer, a personal digital assistant (PDA), and so forth. As those who are skilled in the art will appreciate, terminals 211-1 through 211-N can be different from one another.

Terminal 211-*n* handles calls via exchange 210 and is capable of exchanging voice and call processing-related signals with one or more other devices, such as terminal 101-*m* through network 102. To this end, terminal 211-*n* exchanges Internet Protocol (IP) data packets with private branch exchange 210. It will be clear to those skilled in the art how to make and use terminal 211-*n*.

Interactive voice response (IVR) system 220 is a data-processing system that presents one or more menus to a caller and receives caller input (e.g., speech signals, other media signals, keypad input, etc.) via private branch exchange 210. Many business enterprises employ an IVR system such as system 220. An interactive voice response system typically presents a hierarchy of menus to the caller, and prompts the caller for input to navigate the menus and to supply information to the IVR system. For example, a caller might touch the "3" key of his terminal's keypad, or say the word "three", to choose the third option in a menu. Similarly, a caller might specify his bank account number to the interactive voice response system by inputting the digits via the keypad, or by saying the digits. In many interactive voice response systems, the caller can connect to a person in the enterprise by either selecting an appropriate menu option or by entering the telephone extension associated with that person. It will be clear to those skilled in the art how to make and use IVR system 220.

As will be appreciated by those skilled in the art, some embodiments of the present invention might employ architectures for telecommunications system 100 and call center 103 that are different than that of the illustrative embodiment. It will be clear to those skilled in the art, after reading this specification, how to make and use such alternative architectures.

Figure 3:
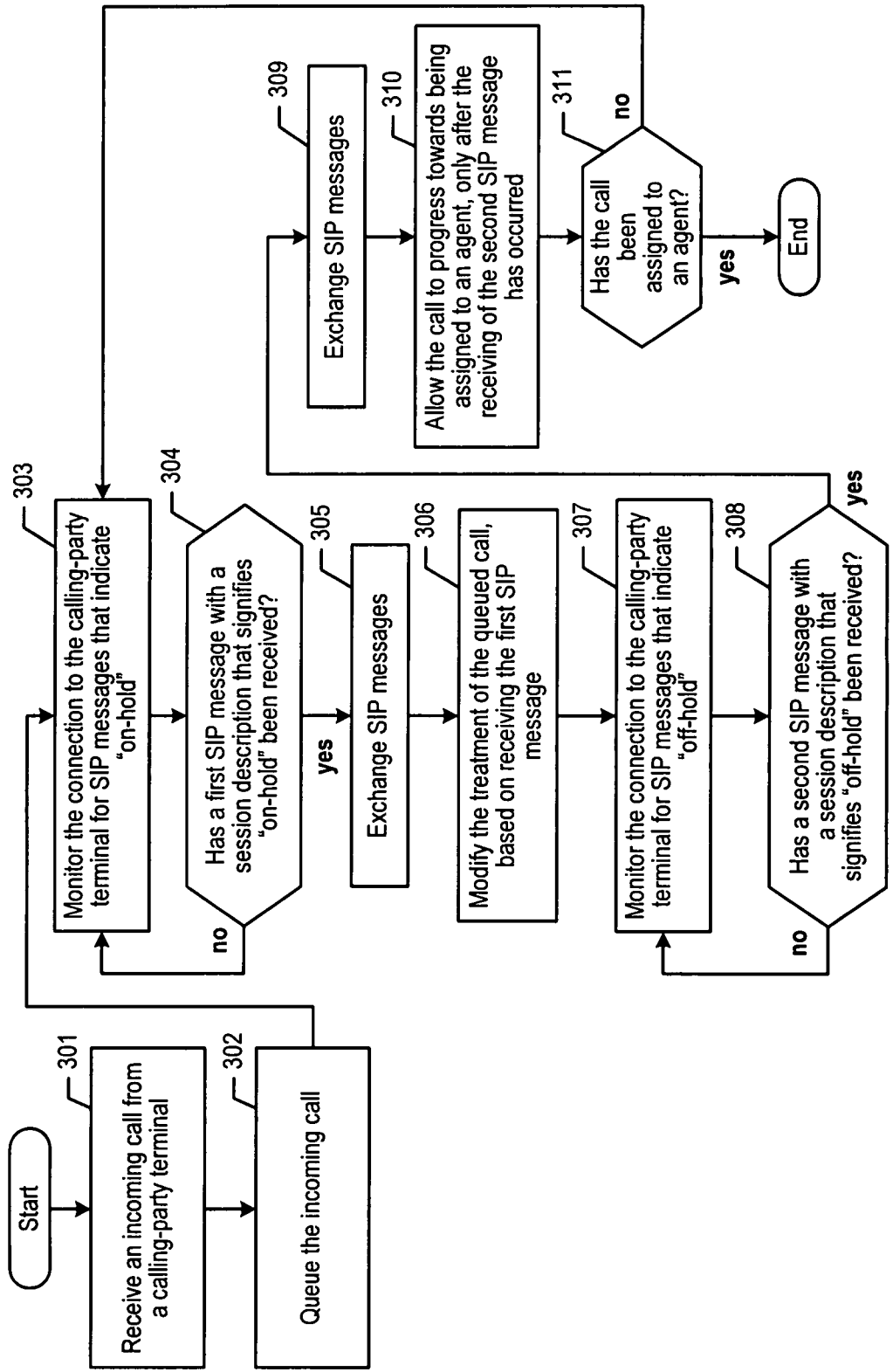
FIG. 3 depicts a flowchart of the salient tasks of private branch exchange 210, which is part of call center 103, in accordance with the illustrative embodiment of the present invention.

FIG. 3 depicts a flowchart of the salient tasks of private branch exchange 210, in accordance with the illustrative embodiment of the present invention. As those who are skilled in the art will appreciate, at least some of the tasks depicted in FIG. 3 can be performed simultaneously or in a different order than that depicted. In accordance with the illustrative embodiment, exchange 210 executes the depicted tasks, which are described below. However, it will be clear to those skilled in the art, after reading this specification, how to make and use alternative embodiments of the present invention, in which a data-processing system other than exchange 210, such as interactive voice response system 220, executes some or all of the described tasks.

The tasks executed by exchange 210 support call-handing at a call center, where human service agents who are stationed at terminals 211-1 through 211-N interact with calling parties who use terminals 101-1 through 101-M to make voice calls. However, it will be clear to those skilled in the art, after reading this specification, how to make and use alternative embodiments of the present invention, in which the tasks described below i) support call-handling functionality other than for a call center or ii) support communication other than voice calls, or both. Furthermore, although an example for a single call is described, it will be clear to those skilled in the art how to concurrently process multiple calls by apply one or more of the described tasks to each call to be managed.

In accordance with the illustrative embodiment, exchange 210 and one or more of terminals 101-1 through 101-M support instant messaging, including calling-party terminal 101-1. However, it will be clear to those skilled in the art, after reading this specification, how to make and use alternative embodiments in which exchange 210 or terminal 101-1, or both, do not support instant messaging.

For pedagogical purposes, each incoming call is queued prior to being routed to the terminal of a service agent. However, as those who are skilled in the art will appreciate, a subset of the incoming calls might be immediately connected to service agents at terminal 211-*n*. Furthermore, it might be another type of party to the call, such as a called party, whose actions are monitored and accounted for in the described tasks. In any event, at least some of the tasks described below concern the interval of time between when i) the calling party initiates the call and ii) the call is routed to its final destination (e.g., to an agent that has become available, etc.).

At task 301, private branch exchange 210 receives an incoming call from calling-party terminal 101-1. In particular, exchange 210 receives a SIP INVITE message from terminal 101-1, or from some intermediate device such as a SIP proxy, in well-known fashion.

In accordance with the illustrative embodiment, terminal 101-1 indicates in the INVITE message that it supports instant messaging by including the "IM message" media in the SDP-compliant session description, in well-known fashion. The SIP set of protocols comprises a standard for instant messaging known as "SIP for Instant Messaging and Presence Leveraging Extensions," or "SIMPLE." Related to this standard, the Message Session Relay Protocol (MSRP) defines a mechanism for sending instant messages within a peer-to-peer session, negotiated by using SIP and SDP. MSRP is documented in the Internet Engineering Task Force (IETF) RFC 4975, which is incorporated by reference herein.

In some alternative embodiments, it is exchange 210 that initially advertises support of instant messaging to terminal 101-1, instead of the other way around. In this case, exchange 210 would offer instant messaging as part of the session description that it sends to terminal 101-1 as part of a "200 OK" message, which is sent in response to the INVITE message received at task 301. Terminal 101-1 can then either accept or reject, in well-known fashion, the offer of the message media that is made by exchange 210.

At task 302, if an agent is presently unavailable to accept the call, exchange 210 queues the call in well-known fashion. While its call is queued, terminal 101-1 is considered to be waiting for an available agent.

At task 303, exchange 210 monitors the connection to terminal 101-1 to check if the terminal is sending another SIP INVITE message—that is, a "re-INVITE" message—which might indicate that the terminal has been put on hold.

At task 304, if exchange 210 receives a re-INVITE request, the exchange checks to see if the re-INVITE comprises an SDP-compliant session description that signifies that calling terminal 101-1 has been put on hold, such as by its user. As those who are skilled in the art will appreciate, a session description that signifies "on-hold" can be achieved by setting the IP address on the "c" (origin) line of the session description to all zeros, with a legal, non-zero port specified in the media description. Alternatively, an "on-hold" session description can also be achieved by specifying "send-only" in the media description, or it can be achieved through other means.

If exchange 210 has not received an "on-hold" indication, task execution returns to task 303. Otherwise, at task 305 and as shown in FIG. 4, exchange 210 responds to the first re-INVITE request or, more specifically, to the "on hold" session description contained in re-INVITE request 401, by sending the corresponding "200 OK" response 402. In accordance with SIP, terminal 101-1 then sends ACK message 403.

Figure 4:
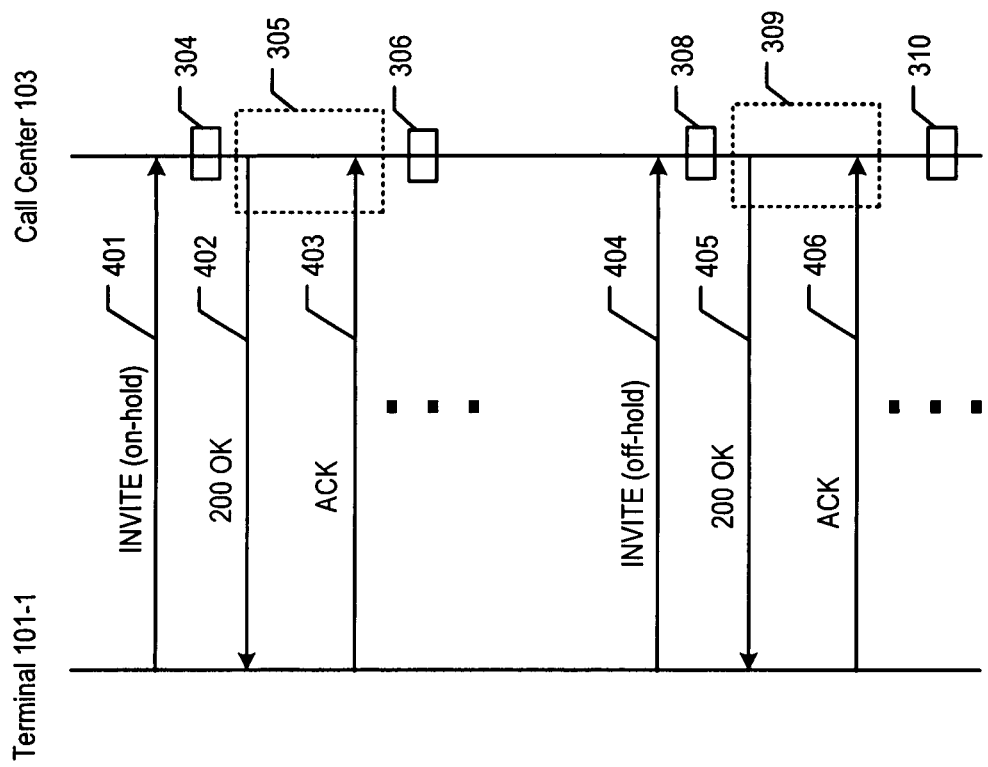
FIG. 4 depicts SIP-related message exchanges that are related to the tasks depicted in FIG. 3.

At task 306, which is depicted in FIGS. 3 and 4, exchange 210 modifies its treatment of the queued call, based on having received the SIP re-INVITE message with the session description that signifies "on-hold". In a general sense, the modification results in the queued call being treated differently in some way, compared to how the queued call was being treated before terminal 101-1 was put on hold. In some embodiments, the modification of the treatment of the queued call is also based on the position of the call in the queue, such as at the top of the queue or elsewhere in the queue.

Several examples are presented here of how the treatment of the queued call is modified. As a first example, when the call treatment is modified, exchange 210 maintains the call at its current position in the queue for at least a predetermined time interval. The current position can be taken as the position at which the "on-hold" SIP message has been received. In some embodiments, once the predetermined time has passed, yet another type of treatment might be applied to the call, such as placing the call at a different position in the queue (e.g., the bottom of the queue, etc.) or removing the call from the queue entirely. Repositioning or removal of the call can be dependent on the call's position in the queue in relation to other calls in the queue.

The predetermined time interval might be based on the level of utilization of a predetermined resource that is associated with the call center. As those who are skilled in the art will appreciate, the predetermined time interval can be greater than or equal to zero time units (e.g., seconds, etc.).

As a second example, when the call treatment is modified, exchange 210 adjusts the rate at which the call is allowed to progress through the queue from a first rate to a second rate. The second rate can be slower than the first rate or faster than the first rate. In some embodiments, the second rate can be based on the level of a predetermined resource that is associated with the call center.

As a third example, the call treatment is modified only after the call has reached the top of the queue with the terminal still on hold, at which point the call can be maintained at the top of the queue at least for a predetermined time interval.

It will be clear to those skilled in the art, after reading this specification, how to make and use embodiments of the present invention in which exchange 210 modifies the treatment of the queued call in a different way than those already described.

At task 307, exchange 210 monitors the connection to terminal 101-1 to check if the terminal is sending a SIP INVITE message that indicates that the terminal has been taken off hold. Additionally, in accordance with the illustrative embodiment, exchange 210 updates terminal 101-1 by sending an instant message via the MSRP command. The terminal's ability to accept such commands was established at task 301. The update can provide status that is related to the call being in the queue. For example, as part of the update, the instant message can indicate terminal 101-1's current position in the queue or the expected wait time. The instant message, as another example, can provide a warning that the user has a specified amount of time (e.g., 10 minutes, etc.) to come off hold or the queued call will be disconnected. As those who are skilled in the art will appreciate, exchange 210 can update terminal 101-1 exactly once while the terminal is on hold, multiple times, or not at all.

By sending an instant message, exchange 210 is able to get word to terminal 101-1's user, even though the user has put the terminal on hold and, consequently, is not in audio contact with the exchange.

At task 308, if exchange 210 receives another re-INVITE request, the exchange checks to see if the re-INVITE comprises an SDP-compliant session description that signifies "off-hold". Such a re-INVITE comprises a "standard" session description that indicates a media stream, in contrast with the first re-INVITE that signified the on-hold condition. For example, the session description might include a media description that indicates that terminal 101-1 is voice-capable, in accordance with a particular codec and so forth.

Regardless of the implementation of the re-INVITE request that signifies an "off-hold" condition, it will be clear to those skilled in the art how to make and use exchange 210 to be able to distinguish between a session description that signifies "off-hold" and a session description that signifies "on-hold".

If a SIP re-INVITE message that indicates "off-hold" has not been received, task execution returns to task 307, in order to continue monitoring for SIP messages and providing updates to terminal 101-1.

However, if such a SIP re-INVITE is received, at task 309 exchange 210 responds to the second re-INVITE request or, more specifically, to the "off hold" session description contained in re-INVITE request 404 in FIG. 4 by sending the corresponding 200 OK response 405. In accordance with SIP, terminal 101-1 then sends ACK message 406.

In accordance with the illustrative embodiment, only after exchange 210 receives the "off-hold" re-INVITE does the exchange re-apply standard call treatment to the queued call.

At task 310, exchange 210 transmits a signal to re-enable the standard treatment of the queued call—that is, the treatment to be applied when the calling terminal is not on hold. For example, exchange 210 might change a flag stored at a memory location in order to indicate that standard treatment is to be applied.

Additionally, in accordance with the illustrative embodiment, exchange 210 updates terminal 101-1 via the audio path associated with the queued call. For example, exchange 210 can indicate terminal 101-1's current position in the queue or the expected wait time. If the call is at the top of the queue, exchange 210 can inform the terminal's user via the audio path that his call is next for an agent. As those who are skilled in the art will appreciate, exchange 210 can update terminal 101-1 one or more times, or not at all. In some embodiments, exchange 210 can use the instant messaging mechanism to update the terminal, similarly to what was described above and with respect to task 307.

At task 311, exchange 210 checks if the call has been routed to its final destination (e.g., to terminal 211-n, etc.). If so, task execution ends. If not, task execution returns to task 303, in order to process any additional on-hold indications that might arrive from terminal 101-1.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:
1. A method comprising:
receiving, by a data processing system, a call from a terminal and placing the call in a queue that is managed, at least in part, by the data processing system;
receiving, at the data-processing system from the terminal, a first session initiation protocol (SIP) message with a session description that signifies "on-hold"; and
maintaining the call at its current position in the queue for a time interval, the maintaining of the call being based on the receiving of the first SIP message;

wherein the current position in the queue is the position of the call in the queue when the first SIP message was received; and wherein the time interval depends on the level of utilization of a resource that is associated with the data-processing system.

2. The method of claim 1 further comprising:

receiving, at the data-processing system from the terminal, a second SIP message with a session description that signifies "off-hold"; and allowing the call to progress towards being assigned to an agent, only after having received the second SIP message.

3. The method of claim 1 wherein the current position in the queue is the position at which the first SIP message has been received.

4. The method of claim 1 further comprising transmitting an instant message to the terminal while the call is being maintained at its current position, wherein the content of the instant message is based on the position of the call in the queue.

5. The method of claim 1 further comprising placing the call at the bottom of the queue after the time interval has passed.

6. The method of claim 1 further comprising removing the call from the queue after the time interval has passed.

7. The method of claim 6 wherein the removal of the call from the queue is also based on the position of the call in the queue in relation to other calls in the queue.

8. A method comprising:

receiving, at a data processing system, a call from a terminal and placing the call in a queue, wherein the call progresses through the queue at a first rate;

receiving, at the data-processing system from the terminal, a first session initiation protocol (SIP) message with a session description that signifies "on-hold"; and adjusting, in response to the first SIP message, the rate at which the call progresses through the queue;

wherein the adjusting comprises setting the call to progress through the queue at a second rate; and wherein the second rate is selected by the data processing system to be slower than the first rate.

9. The method of claim 8 further comprising:

receiving, at the data-processing system from the terminal, a second SIP message with a session description that signifies "off-hold"; and allowing the call to progress through the queue at the first rate only after having received the second SIP message.

10. The method of claim 8 wherein the second rate is based on the level of utilization of a resource that is associated with the data-processing system.

11. The method of claim 8 further comprising transmitting an instant message to the terminal, wherein the content of the instant message is based the rate at which the call is allowed to progress through the queue.

\* \* \* \* \*